Jan. 19, 1926.　1,570,174
W. PATERSON ET AL
TRUCK TIRE TRACTION CHAIN
Filed April 20, 1925
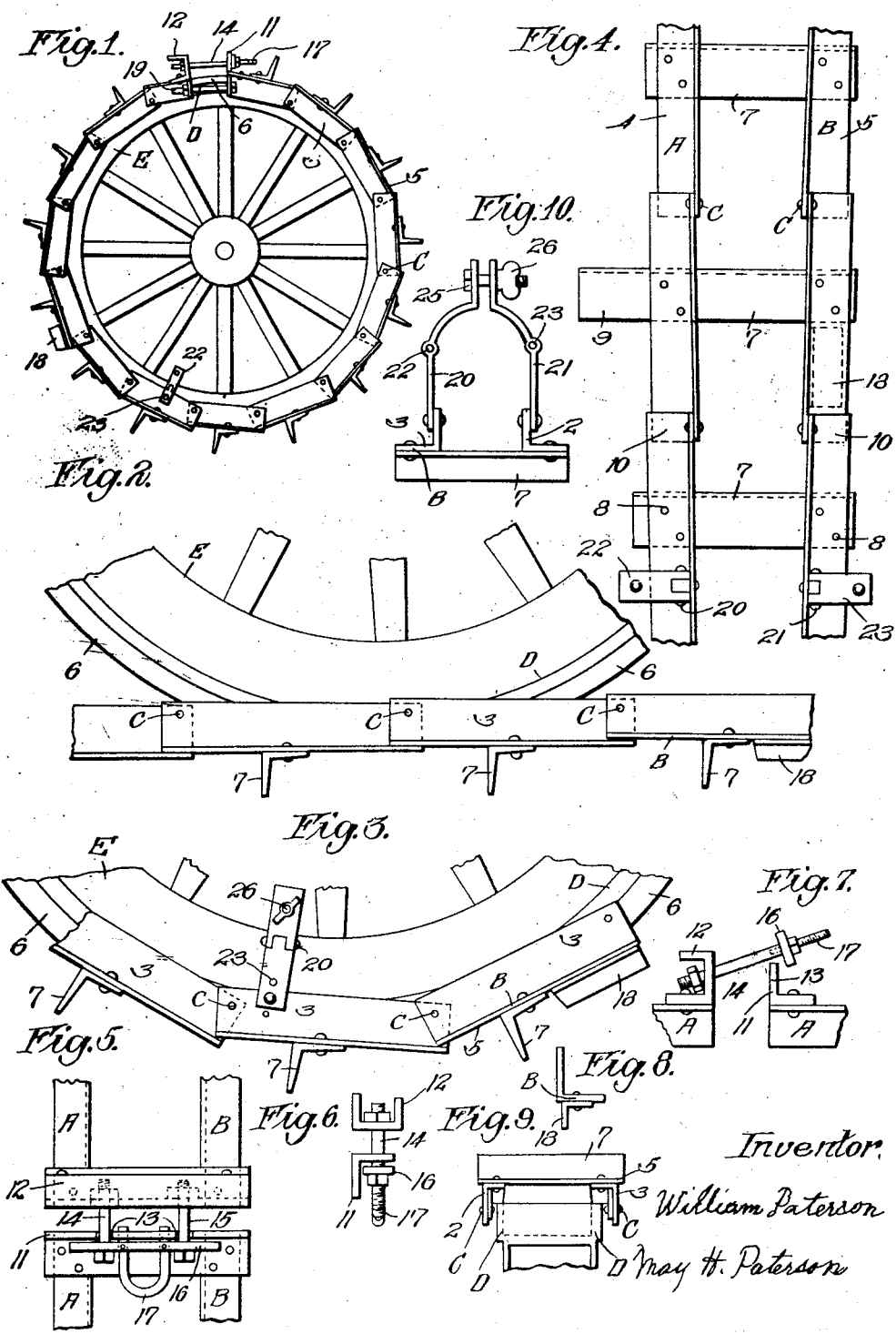

Patented Jan. 19, 1926.

1,570,174

UNITED STATES PATENT OFFICE.

WILLIAM PATERSON AND MAY H. PATERSON, OF OAKLAND, CALIFORNIA.

TRUCK TIRE TRACTION CHAIN.

Application filed April 20, 1925. Serial No. 24,699.

*To all whom it may concern:*

Be it known that we, WILLIAM PATERSON and MAY H. PATERSON, citizens of the United States, residing at Oakland, in the county of Alameda and State of California, have invented a new and useful Truck Tire Traction Chain.

Our invention relates to improvements in truck tire traction chains.

The invention consists of a plurality of rectangular plates pivotally connected axially to the ends of angle plates, so as to form links to fold around the tire and enclose the side rims of a hard rubber tire wheel. Said angle plates or links are so disposed that the lateral angle of said angle plates forms a base flush with the face of the rubber tire, so that a transverse angle plate being riveted to the lateral angles of said links, forms traction grippers for the drive wheels of a truck.

It further consists in certain details of construction, all of which will be more fully explained by referring to the accompanying drawings, in which—

Figure 1 is a side elevation of a truck wheel, having our truck tire traction chain attached.

Fig. 2 is an enlarged side view of part of a truck wheel, treading the chain links lying horizontally on the ground.

Fig. 3 is an enlarged side view of part of a truck wheel, showing several angle links surrounding part of the periphery of a truck wheel.

Fig. 4 is a plan view of a part of the angle links pivotally connected, and having the transverse angle plates attached that form the traction grippers.

Fig. 5 is a plan view of a coupling device that connects the two ends of the angle link chain around the face and sides of a truck wheel.

Fig. 6 is an end view of said coupling device.

Fig. 7 is a side elevation of a part of said coupling device.

Fig. 8 is an end view of an angle link, having an auxiliary anti-skid angle plate, attached to said angle link.

Fig. 9 is a vertical cross section showing the traction grippers mounted upon the lateral flanges of the side links, the lateral flanges of said side links being turned in toward the center of the tire, in contradistinction to the lateral flanges of side links shown in Figures 1, 2, 3 and 4, which show the lateral flanges on said side links, turned away from the center of said tire, but serving the same purpose.

Fig. 10 is a vertical end view of an auxiliary clamp which prevents the truck wheel tire from slipping around inside the chain.

The object of our invention is to provide a flexible removable traction chain for truck drive wheels, securing traction in a field, or unpaved road. A further object is to readily change a truck to a tractor, by attaching our traction chain to ordinary truck drive wheels. It is a further object of the invention to afford a traction chain adapted to surround the periphery of the drive wheels of a tractor; the grippers that are attached to said chain being adapted to take the place of the grippers that are usually fixed to the face of the ordinary drive wheels of a tractor.

In the drawing A represents one of the rectangular plates and B represents the other rectangular plate, said plates being arranged in pairs forming a link pivotally connected at C, the perpendicular flange 2 of link A, and the perpendicular flange 3 of link B, being adapted to fit on each side of the rim D, of a truck wheel, the lateral flange 4 of link A, and the lateral flange 5 of link B, being flush with the face of the rubber tire 6, forms a base for the transverse angle plate 7. The lateral flange of said transverse angle plate 7, is riveted to the lateral flange 4 on link A at one of its ends at 8, the other end of the lateral flange of said transverse angle plate 7 being riveted to the lateral flange 5 on link B, at 8. Said transverse angle plate 7 being riveted to angle links A, and B, with regard to the space required for the width of the truck wheel rim D. Said transverse angle plate 7 being the traction gripper, can be extended laterally beyond the angle link A, as shown on Fig. 4 at 9. Rectangular links A and B lap over each other, shingle fashion, at their pivotal connections 10, 10. This arrangement provides a uniform base for each transverse angle plate 7, and renders the chain rigid when laid on the ground.

The method of attaching said chain to the truck wheel, would be to lay the chain on the ground in alignment with the truck body at the proper distance apart to suit the tread of the truck wheels, drive on midway of the chain, lift up the two ends, and couple them together by the mechanism shown at Figures 5, 6, 7, and 8, and Fig. 1. The ends of the links A, and B, shown at Fig. 5, have auxiliary transverse angle plates 11 and 12 riveted to links A and B. At one end of the chain the outwardly projecting angle of the tarnsverse plate 11, having two gabs 13 and 13, adapted to receive the shanks of two bolts 14 and 15, said bolts pass through a clip 16, said projecting angle of plate 11 having two holes adapted to receive two ends of a U-shaped bolt 17; a transverse channel plate 12, is riveted to the opposite end of the chain, having elongated holes adapted to receive the bolts 14 and 15. The transverse channel plate 12 furnishes housing to protect the threaded bolts 14 and 15.

The U bolt 17 is fastened to clip 16, when said U bolt is inserted in the two holes in the transverse angle plate 11; the bolts 14 and 15 cannot escape the gabs 13 and 13, while being tightened up, or while traveling.

The anti-skid angle plate 18, shown in Fig. 8, is attached to the outer lateral flange of link B, and in alignment with link B, being at right angles to the transverse traction grippers, prevents the machine from skidding sidewise.

The ends of the chain may be coupled together by bolts 19 on each side of the rim of the truck wheel as shown in Fig. 1, but we prefer the mechanism designated on Figures 5, 6, and 7.

Fig. 10 represents a clamp pivotally connected to the vertical flange 2, on plate A at one of the ends, and similarly connected to flange 3 on plate B at the other end, said clamp is furnished with hinges 20 and 21 which permits the clamp to open as shown at 22, and 23, to receive the tire of a truck wheel as shown in Fig. 4. A bolt 25 and butterfly nut 26 fastens said clamp enclosing tire 6, rim D, and felly E, of the truck wheel.

Pressed steel angle plates may be used to form this chain, but we prefer commercial angle steel, for its construction, as being more convenient, simple and economic.

What we claim is:—

1. In a truck tire traction chain, a series of angle plates, pivotally connected together at the ends of the perpendicular sides of said angle plates, arranged in pairs to fit around the periphery and side rims of a truck wheel, the lateral flanges of each pair of said angle plates being flush with the face of the rubber tire of a truck wheel, a transverse angle plate fixed at each of its ends to the lateral flanges of said pair of angle plates forming continuous enclosing links around the periphery and sides of the tire of said wheel, the outwardly projecting angle of said transverse angle plates mounted upon each pair of said side angle plates, forming traction grippers.

2. In a truck tire traction chain, a series of oblong angle plates, pivotally connected to each other in pairs, their perpendicular flanges adapted to hug the sides of the rim of a truck wheel, a transverse angle plate fixed at each of its ends to the lateral flange of said side angle plates, forming a gripper and a complete link in said chain, a series of said links forming a chain capable of being folded around the periphery of a truck wheel; a coupling mechanism, an auxiliary transverse angle plate fixed to the end plates of one end of the chain, two gabs, and two holes in the outwardly projecting angle of said transverse plate adapted to receive two bolts, said bolts passing through two holes in a clip plate, said clip plate having a U bolt fixed to said clip plate, the two ends of the U bolt projecting through said clip plate, and adapted to fit in two holes in said outwardly projecting flange of said transverse plate, mounted transversely upon the ends of the links on the other end of the chain, is a channel shaped plate having two holes adapted to receive the threaded ends of two bolts, nuts upon said bolts being housed within said channel plate, said bolts together with said clip plate, and said U bolt, forming a coupling link that fastens the two ends of the chain together.

3. In a truck tire traction chain, a series of oblong angle plates pivotally connected to each other in pairs, the perpendicular flanges of each pair of angle plates being adapted to fit on each side of the rim of a truck wheel, a transverse angle plate mounted upon the lateral sides of said pair of angle plates, forming a link and traction gripper combined, a clamping device composed of two links, or stirrups, pivotally connected to the outside of the flanges that hug the rim of the truck wheel, said clamp links having hinges that enable the stirrups to open to admit the entrance of the tire of a truck wheel, and to enclose and fasten said side angle plates to the tire and fellies of a truck wheel.

4. In a truck tire traction chain, a plurality of oblong angle plates pivotally connected to each other at the ends of the perpendicular sides of said angle plates, forming links arranged in pairs, to fit around the periphery and side rims of a truck wheel, an anti-skid angle plate attached to the lateral side flange in alignment with, and projecting outwardly from said flange, or link, to prevent the wheels from skidding sidewise.

WILLIAM PATERSON.
MAY H. PATERSON.